US008434249B2

(12) United States Patent
Wieneke

(10) Patent No.: US 8,434,249 B2
(45) Date of Patent: May 7, 2013

(54) MARKING DEVICE

(75) Inventor: Andreas Wieneke, Lemgo (DE)

(73) Assignee: Wiedmueller Interface GmbH & Co. KG, Detmold (DE)

( * ) Notice: Subject to any disclaimer, the term of this patent is extended or adjusted under 35 U.S.C. 154(b) by 165 days.

(21) Appl. No.: 12/867,783

(22) PCT Filed: Mar. 6, 2009

(86) PCT No.: PCT/EP2009/052680
§ 371 (c)(1),
(2), (4) Date: Aug. 16, 2010

(87) PCT Pub. No.: WO2009/121683
PCT Pub. Date: Oct. 8, 2009

(65) Prior Publication Data

US 2011/0005110 A1 Jan. 13, 2011

(30) Foreign Application Priority Data

Apr. 2, 2008 (DE) .................... 20 2008 004 596 U

(51) Int. Cl.

| | |
|---|---|
| ***G09F 3/00*** | (2006.01) |
| ***B65D 63/00*** | (2006.01) |
| ***B65D 67/02*** | (2006.01) |
| ***F16L 33/00*** | (2006.01) |
| ***F16L 3/08*** | (2006.01) |
| ***F16L 3/12*** | (2006.01) |

(52) U.S. Cl.
USPC .......... 40/316; 24/16 PB; 24/17 B; 24/17 AP; 24/23 W; 248/74.1; 248/74.3

(58) Field of Classification Search .................... 40/316; 24/16 PB, 17 B, 17 AP, 23 W; 248/74.1, 248/74.3
See application file for complete search history.

(56) References Cited

U.S. PATENT DOCUMENTS

| | | | | |
|---|---|---|---|---|
| 4,637,097 A * | 1/1987 | Secord | ........................ | 24/16 PB |
| 5,108,055 A * | 4/1992 | Kreinberg et al. | .............. | 248/71 |
| 5,115,586 A * | 5/1992 | Hawker | .......................... | 40/316 |
| 5,474,268 A * | 12/1995 | Yu | .................................. | 248/61 |
| 7,201,351 B2 * | 4/2007 | Stigler | ......................... | 248/74.1 |
| 7,661,631 B2 * | 2/2010 | Ibaraki | ............................ | 248/73 |
| 7,712,708 B2 * | 5/2010 | Clark | ........................... | 248/74.4 |

FOREIGN PATENT DOCUMENTS

| | | |
|---|---|---|
| DE | 68907211 T2 | 11/1989 |
| DE | 19819865 A1 | 11/1999 |

(Continued)

*Primary Examiner* — Joanne Silbermann
*Assistant Examiner* — Syed A Islam
(74) *Attorney, Agent, or Firm* — Lawrence E. Laubscher, Sr.; Lawrence E. Laubscher, Jr.

(57) ABSTRACT

A marking device for a generally cylindrical conductor of fluids, electricity, light waves and the like includes a hollow shell containing a horizontal longitudinal through passage for receiving one of a plurality of conductors of different diametric sizes, the shell being horizontally divided to define an upper shell section having a lower internal surface provided with a conductor seat, and a lower shell section including an internal resilient support device for biasing the conductor laterally upwardly toward the seat. An indicia-bearing plate is connected with the external surface of the upper shell section directly above the conductor seat. The conductor seat, the indicia-bearing plate, and the biasing device are symmetrically arranged relative to the vertical plane passing longitudinally through the shell, whereby the biasing forces are uniformly balanced for conductors having different diametric sizes.

9 Claims, 7 Drawing Sheets

FOREIGN PATENT DOCUMENTS

| | | | |
|---|---|---|---|
| DE | 29916770 | U1 | 2/2000 |
| DE | 202004009980 | U1 | 12/2005 |
| DE | 202007005563 | U1 | 9/2007 |
| EP | 0924712 | B1 | 2/2005 |

* cited by examiner

Fig. 10
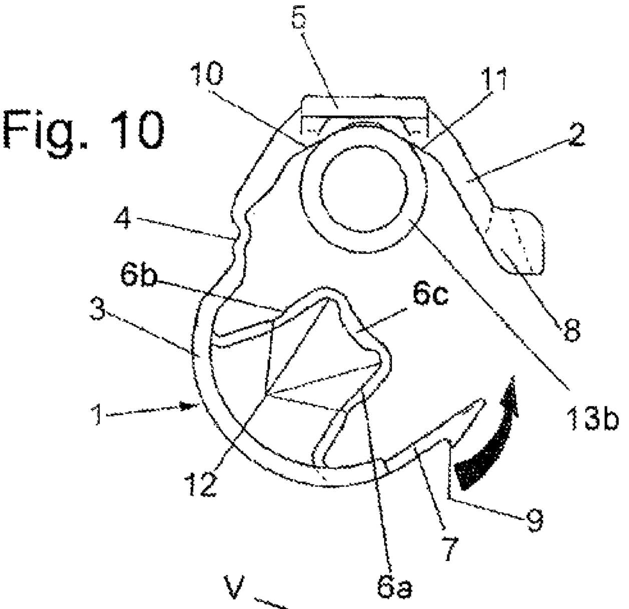
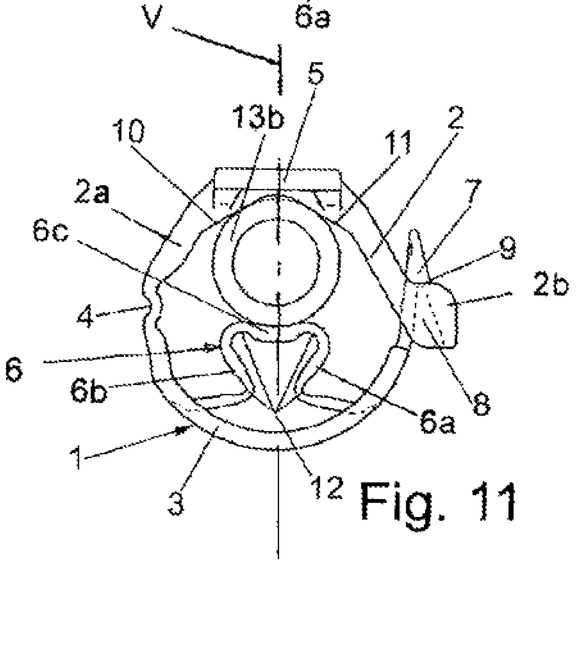
Fig. 11

Fig. 12
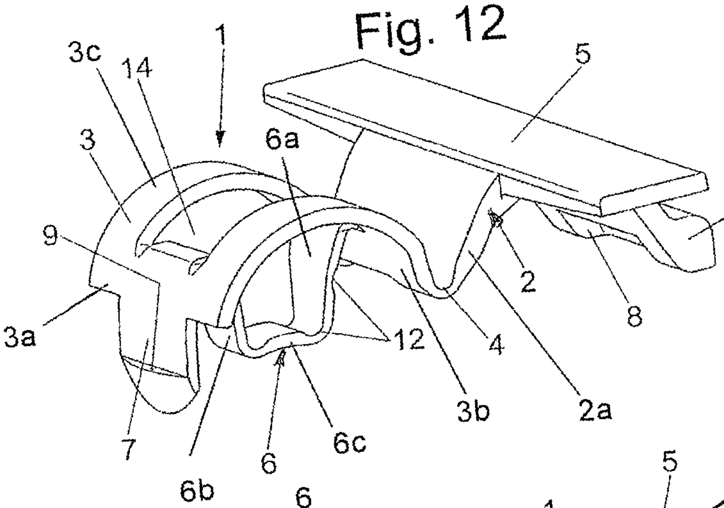
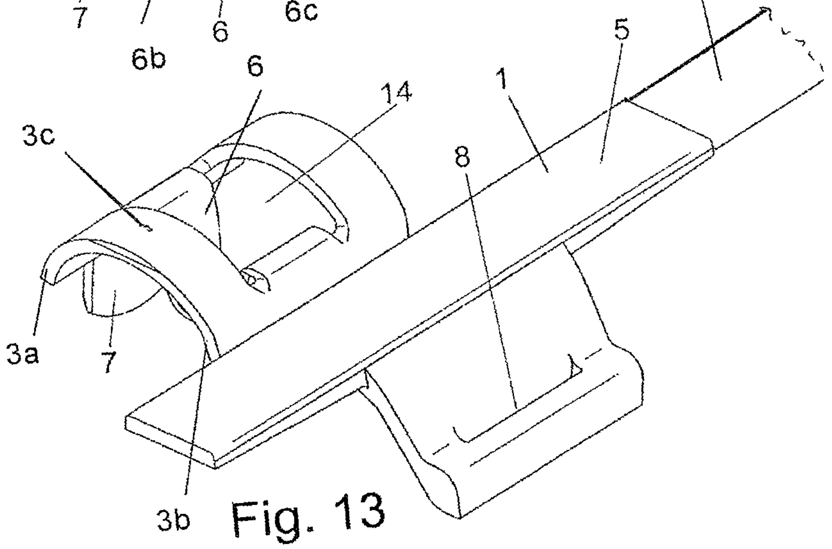
Fig. 13

Fig. 14
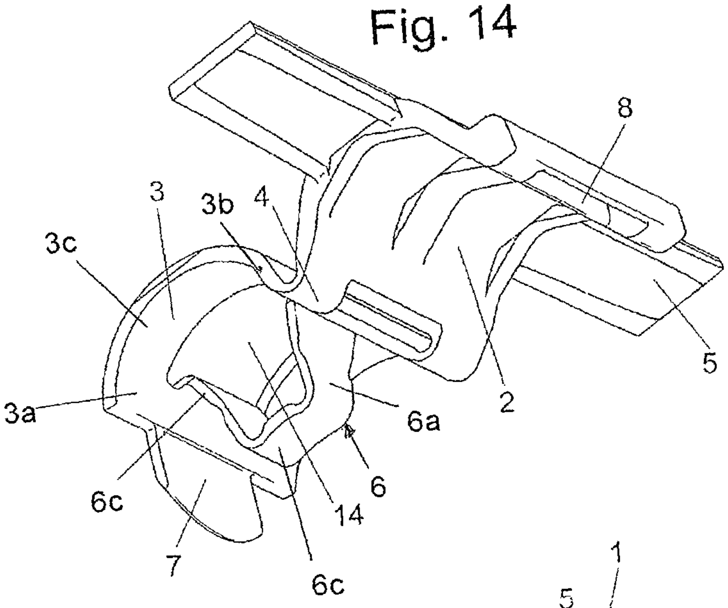
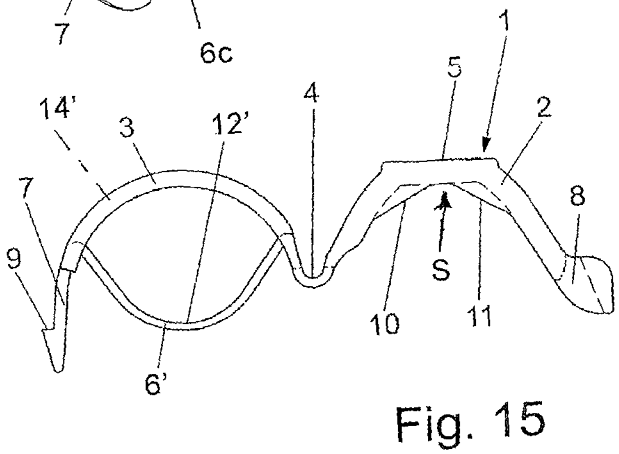
Fig. 15

MARKING DEVICE

REFERENCE TO RELATED APPLICATIONS

This application is a national stage application based on the International Application No. WO 2009/121683 A1 filed Oct. 8, 2009, which in turn is based on the PCT Application No. PCT/EP2009/052,680 filed Mar. 6, 2009, claiming priority of the German application No. 20 2008 004 596.7 filed Apr. 2, 2008.

BACKGROUND OF THE INVENTION

1. Field of the Invention

A marking device for a generally cylindrical conductor of fluids, electric energy, light waves and the like, includes a hollow shell containing a horizontal longitudinal through passage for receiving one of a plurality of conductors of different diametric sizes, the shell being horizontally divided to define an upper shell section having an internal surface provided with a centrally-arranged downwardly-directed conductor seat, and a lower shell section including internal resilient support means for biasing the conductor laterally upwardly toward the conductor seat. An indicia-bearing plate is connected with the external surface of the upper shell section directly above the conductor seat.

2. Description of Related Art

In the case of installations with electrical, fluid or light-conducting lines, it is necessary as a rule to make sure that the lines—especially the cables—are marked for matchup connection. For this purpose, one applies on the outside preferably dimensionally stable inscription tabs, certain digits and/or numbers and/or symbols, which, however, can also be printed on a label that is then glued upon the inscription tab. The two partial shells can be flexibly connected with each other by means of a hinge and the two partial shells can be locked together with each other by a locking hook that constitutes the terminal element of one partial shell and that for purposes of locking in a lock seat can be inserted into the other partial shell. In this position, a stepped catch undercuts the lock seat.

According to the typical state of the art as shown in the Wieneke et al European patent No. EP 0 924 712 B1 (which is assigned to the same assignee as the present invention), a conductor biasing element is provided in the form of a loop-shaped clamp strap. In this known embodiment, the lines or conductors having a relatively small diameter section are attached against partial shells that are attached eccentrically on the indicia bearing tab that have an angular cross-section. The clamping of these marking devices is to be further improved in accordance with the present invention.

Reference is further made to the Hawker U.S. Pat. No. 5,115,586, wherein a marking device is disclosed that is made up of likewise two adjoining and locked half-shells; here, due to the geometry that has been selected for the conductor biasing means, it is very difficult to mark a conductor or line whose inside diameters almost correspond to the inside diameter of mutually adjoining locked partial shells.

SUMMARY OF THE INVENTION

Accordingly, a primary object of the present invention is to provide a marking device including a hollow shell containing a horizontal longitudinal through passage for receiving a generally cylindrical conductor for fluids, electricity, optical light waves, or the like, said shell being horizontally divided to define an upper shell section having an internal surface provided with means defining a downwardly-directed conductor seat, and a lower shell section including resilient support means for biasing the conductor laterally upwardly toward said conductor seat. An indicia-bearing plate is connected with the external surface of said upper shell section directly above the conductor seat. The conductor seat, the indicia-bearing plate, and the biasing means are symmetrically centrally arranged relative to the vertical plane passing longitudinally through the shell, whereby the biasing forces are uniformly balanced for conductors having different diametric sizes.

According to another object of the invention, hinge means pivotally connect the lower shell section for movement from a closed position relative to said upper section toward an open position, thereby to permit the lateral insertion of the insulated conductor within said upper section adjacent the conductor seat A further object is to provide releasable locking means for locking together said shell sections when said lower shell is in said closed position.

According to a more specific object, the biasing means comprises a resilient conductor support strap that is integrally formed by stamping and deformation from the lower shell section. The support strap has a horizontal center support that is supported by a pair of resilient legs that are collapsible in accordance with the diametric size of the conductor. In a first embodiment, the support strap has a generally trapezoidal cross-sectional configuration, with the resilient legs being provided with restrictions or deformations that define the leg sections of the collapsible legs. In a second embodiment, the resilient support strap has a convex semi-circular configuration, said strap being provided with a central restriction such that the resilient strap is collapsed in accordance with the diametric size of the insulated conductor.

According to another feature, the partial shell, which carries the inscription plate, has a prismatic shape on its internal side that faces toward the line in the inscription area, and the biasing element is made as an elastic supporting body that in the locked state is opposite the inscription area.

As a result of the prismatic shape of the internal surface, the line is centered, that is to say, it is always precisely centrally aligned. That is done in conjunction with the pressure force that is applied upon the line by the supporting body. The prismatic internal surface in this case is designed for the maximum diameter of the line that is to be marked. The same also applies to the elastic supporting body, which exerts a pressure force also in the case of lines in the lower diameter range.

In accordance with a more specific object, the biasing element is made as a resilient supporting body that in the locked state is opposite the indicia-bearing plate, and that is so arranged and shaped on a partial shell that in case of markings of lines of a certain predetermined line diameter, it will be pressed forward and outward through an opening in the partial shell below the outer circumference of that partial shell. Starting with a certain diameter, such parts of supporting body can thus get "to the outside" through the opening. In this way, one can in a simple manner also mark lines whose diameter almost corresponds to the inside diameter of the closed marking device.

According to a preferred embodiment, it is provided that the supporting body has a trapezoidal cross-section or, related to the locked state of the two partial shells, it has the shape of an inverted U-shaped configuration. As a result, in case of lines in the larger diameter range, one can achieve an extreme deformation so that the return forces will be correspondingly large. The supporting body is also so designed that one can also apply pressure forces in case of lines in the smallest diameter range.

To make sure that the deformation of the supporting body will always be identical, it is provided, according to a preferred embodiment, that said body be provided with cross-section constrictions that are arranged at an interval with respect to each other. These constrictions can also be provided alternately on differing sides of the supporting body.

According to another embodiment, it is provided that the supporting body have the shape of an arc. The restoring forces that are applied by the deformation in this embodiment, however, are adequate, although they are less than in the case of the previously mentioned embodiment. To make sure the deformation of this supporting body will also exist appropriately, the cross-section constriction is placed in the middle area and preferably runs continually.

The following is provided to make sure that adequate pressure forces are transferred from the supporting bodies also upon lines in the lower diameter range. Connected in the non-deformed state of the supporting body, the area associated with the indicia-bearing plate protrudes over the separating plane constituted by the partial shells in the direction toward the inscription tab. In the slack state, the area of the supporting body, which is associated with the inscription tab, then protrudes all the way into the partial shell that carries the indicia-bearing plate.

The prismatic shape of the interior surface of the partial shell that carries the indicia-bearing plate is constituted by oblique surfaces that are at an obtuse angle with respect to each other. The transition area between the two oblique surfaces runs along an arch.

It is further provided that at least one or both partial shells have a semicircular cross-section. For their locking, it is provided that the free terminal area of the partial shell that has the supporting body be made as a catch hook with a catch, and the free terminal area of the partial shell carrying the inscription tab is made as lock seat.

According to another variant and inventive design, the marking devices, especially their indicia-bearing plates, are so shaped that one can place several marking devices on one line axially or, in the direction of the line, directly against each other for which purpose the adjoining terminal areas of the marking devices, in particular, the inscription tabs, preferably engage each other in a form-locking manner and/or in a force-locking manner.

BRIEF DESCRIPTION OF THE DRAWINGS

Other objects and advantages of the invention will become apparent from a study of the following specification, when viewed in the light of the accompanying drawing, in which:

FIGS. 8-11 illustrate the steps for mounting the marking device upon the conductor of FIG. 5;

FIGS. 12 and 13 are left and right top perspective views of the marking device of FIG. 1, and FIG. 14 is a bottom perspective view of the apparatus of FIG. 1;

FIG. 15 is an end view of a second embodiment of the invention when in the open condition.

DETAILED DESCRIPTION OF THE INVENTION

For the purpose of the following description of the invention, the term "conductor" shall mean a conduit for conducting liquid and gaseous fluids, an insulated conductor or cable for conducting electrical energy, fiber optic conductors for light wave energy, and similar generally cylindrical components.

Figure 1:
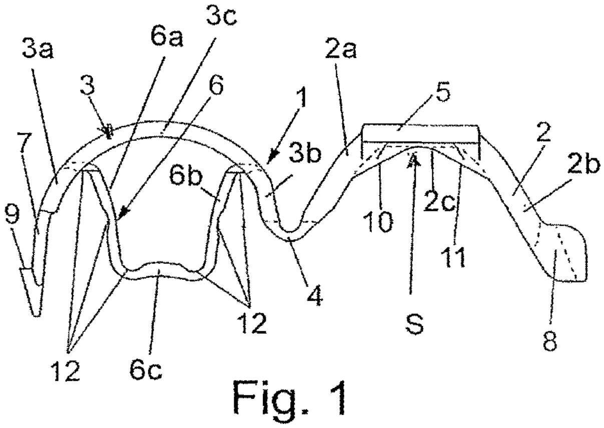
FIG. 1 is an end view of a first embodiment of the marking device of the present invention when in the open condition.
Figure 2:
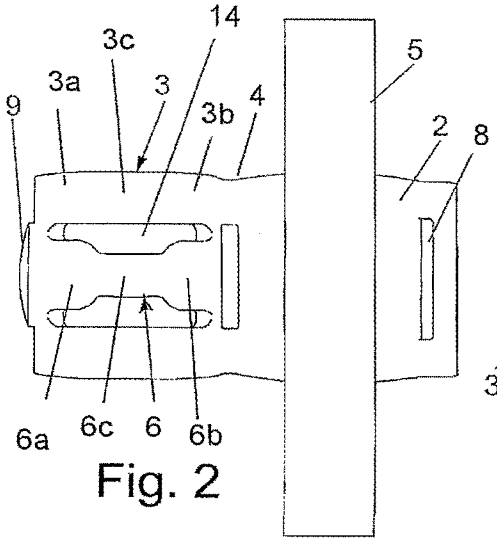
FIGS. 2 and 3 are top and left hand end views of the marking device of FIG. 1.
Figure 3:
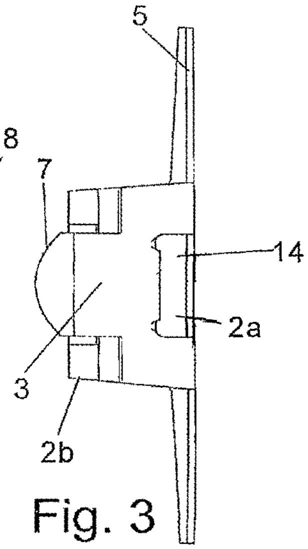

Referring first more particularly to FIGS. 1-4, the marking device 1 of the present invention comprises a generally tubular sectional shell 1 which is horizontally divided to define upper and lower shell sections 2 and 3, respectively, hingedly connected by integral flexible hinge means 4. The upper shell section has a generally inverted U-shaped cross-sectional configuration including a pair of leg portions **2*a* and 2*b* joined by a bridging portion 2*c*. As shown in FIG. 1, the central portion of the internal surface of the upper shell section 2 is provides with a pair of generally flat linear, non-circular, non-arcuate surfaces 10 and 11** that are arranged at an obtuse angle, thereby to define a downwardly directed conductor seat S.

Similarly, the lower shell section 3 has an inverted U-shaped configuration including a pair of leg portions **3*a* and 3*b* connected by a curved bridging portion 3*c*. Deformed inwardly by partial punching and deformation from the curved bridging portion 3*c* (FIGS. 12-14) is an integral generally-trapezoidal transversely-extending resilient support strap 6 having a pair of generally vertical resilient leg portions 6*a* and 6*b* joined at their free ends by a horizontal center support portion 6*c*. A plurality of flexible constrictions 12 serve to define articulated collapsible leg sections 6*a*', 6*a*", 6*b*', and 6*b*" that are hingedly connected with the lower shell section and with the center strap portion 6*a*. The articulated leg portions contain flexible constrictions 12 that define leg sections 6*a*', 6*a*", and 6*b*', 6*b*", which sections are connected with the lower shell section and with the center portion 6*c* by further flexible constrictions 12**.

Figure 4:
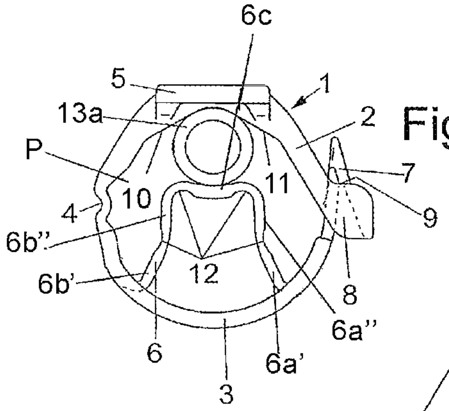
FIGS. 4-7 are end views of the apparatus of FIG. 1 when in the closed condition, when supporting conductors of different diametric sizes, respectively.
Figure 5:
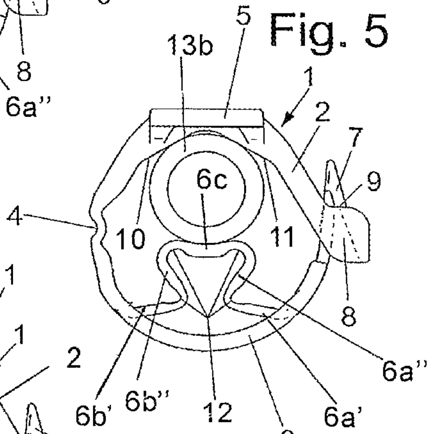
Figure 6:
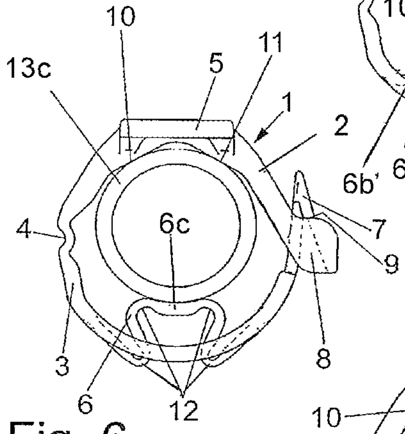
Figure 7:
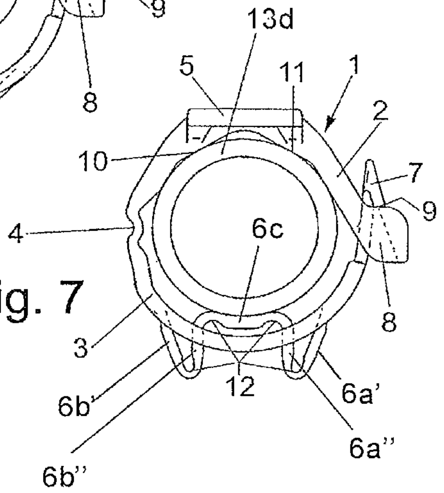
Figure 8:
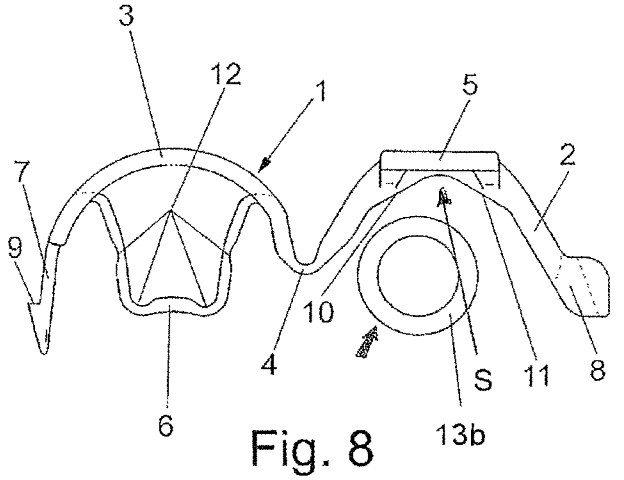
Figure 9:
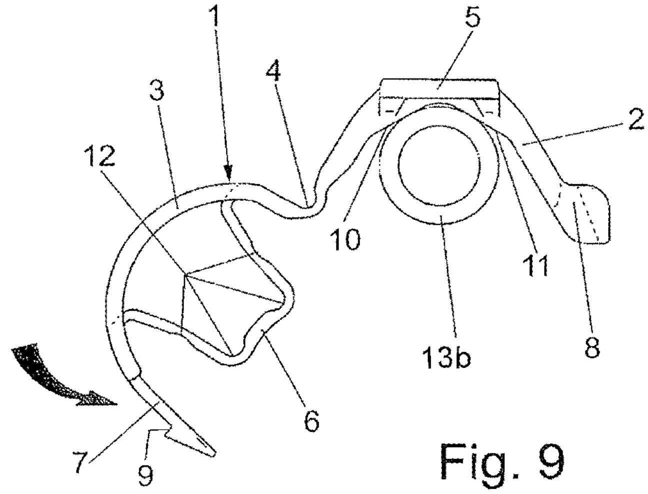
Figure 16:
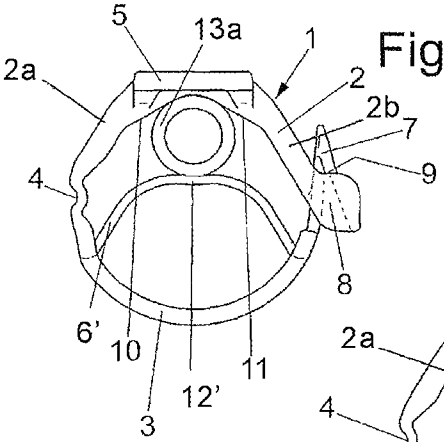
FIGS. 16-19 illustrate the apparatus of FIG. 15 when in the closed condition for accommodating conductors of different diametric sizes.

The free leg portion **3*a* of the lower shell section is provided with a locking tongue 7 that carries a locking catch 9, which tongue is adapted for insertion into a corresponding locking opening 8 contained in the free end of the upper leg portion 2*b*. Thus, after a conductor 13*a* has been laterally introduced within the upper shell section 2 for engagement with the conductor seat S defined by the inclined surfaces 10 and 11, the lower section is pivoted toward the closed position of FIG. 4, whereupon the sections are automatically locked together by the insertion of locking tongue through the opening 8 until the catch 9 engages the adjacent external surface of the leg portion 2*b*. As shown in FIG. 4, the conductor 13*a* is laterally supported on the center support section 6*c*, and is resiliently biased by the strap leg portions 6*a* and 6*b*** toward the conductor seat S.

According to a characterizing feature of the invention illustrated in FIGS. 4-7, the resilient strap leg portions **6*a* and 6*b* are collapsible to accommodate conductors 13*a*, 13*b*, 13*c*, and 13*d* of various progressively-increasing diametric sizes. Thus, in FIG. 5, the strap leg portions are partially collapsed within the shell chamber C by the conductor 13*b*, and for a larger conductor 13*c* (FIG. 6) the strap leg portions are further collapsed such that the articulated center portions of the legs protrude outward of the circumferential surface of the shell via the opening 14 (FIGS. 2, 12 and 13) defined during the formation of the support strap 6**. In the case of a conductor

13*d* or maximum diametric size (FIG. 7), the support strap leg portions are in the fully collapse condition, with a substantial amount of the collapsed leg portions extending outwardly of the shell.

FIGS. 8-11 illustrate the steps for mounting the marker device on the conductor 13*b* of F*ig*. 5. As the conductor is laterally inserted into the upper shell section 2 (FIG. 8) toward engagement with the conductor seat S (FIG. 9), the lower shell section 3 is progressively pivoted (FIG. 10) toward the closed locked position of FIG. 11, whereupon the horizontal center portion 6*c* engages the conductor 13*b* to partially collapse the resilient support strap leg portions 6*a* and 6*b*, and to bias the conductor laterally upwardly toward the conductor seat S and the indicia-bearing plate 5. The lower shell section is locked into engagement with the upper shell 2 by the engagement of the catch 9 with the outer surface of the shell leg portion 2*b*. Owing to the symmetrical arrangement of the components relative to the vertical longitudinal plane V passing through the shell 2, the biasing forces and stresses acting on the conductor are balanced. As shown in FIG. 11, the flat planar internal wall surfaces 10 and 11 of the support seat S and the support strap center portion 6*c* are symmetrically arranged relative to this vertical longitudinal plane V.

Figure 17:
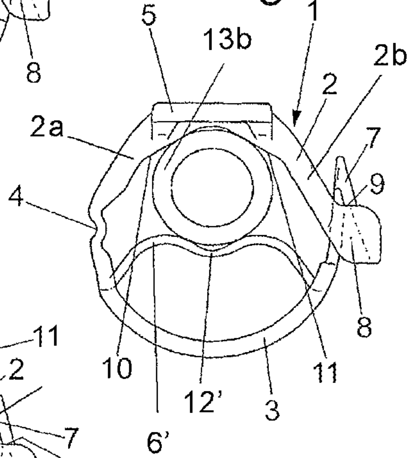
Figure 18:
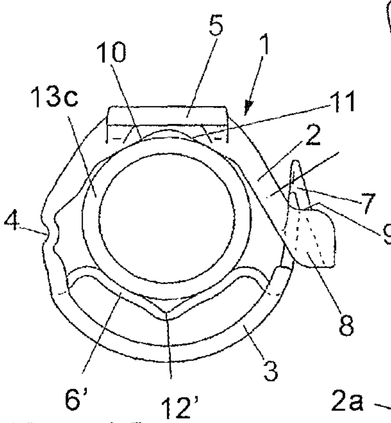
Figure 19:
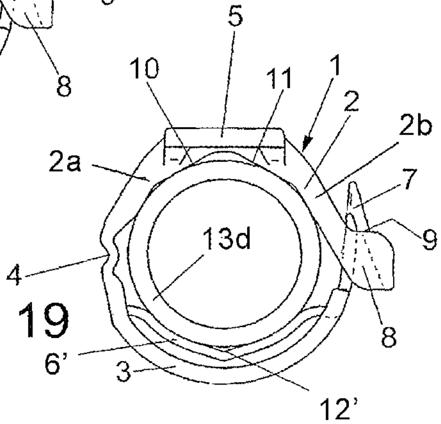

Referring now to FIGS. 15-19, according to an alternate embodiment of the invention, the transverse support strap 6' is partially punched from the lower shell section 2 to define the opening 14', and is deformed to have a generally semi-circular curved cross-sectional configuration, the center portion of the strap containing at least one constriction 12'. When the lower shell section 3 is pivotally displaced toward the closed position of FIG. 16, the central portion of the resilient support strap 6' engages the conductor 13*a* and biases the same laterally upwardly toward the conductor seat S. As shown in FIGS. 17-19, for conductors 13*b*, 13*c* and 13*d* of progressively increasing diametric sizes, the resilient support strap 6' is progressively collapsed correspondingly. In each case, the indicia-bearing plate 5, the conductor seat S, and the central portion of the support strap are symmetrically arranged relative to the vertical plane passing longitudinally though the shell.

The invention is not confined to the illustrated exemplary embodiment. It is advantageous that the marking device, made up of two partial shells 2, 3 on the inside in the area of the inscription tab 5, has a prismatic shape by virtue of two oblique surfaces 10, 11 that are at an obtuse angle with respect to each other so that each diameter of a conductor 13 will be centrally aligned and so that the other partial shell 3 will have an elastic supporting body 6, which is increasingly deformed as the diameter of conductor 13 increases.

Although the shell 1 has been desired as being formed from a synthetic plastic material, it is apparent that it could be formed from a resilient metal material as well.

While in accordance with the provisions of the Patent Statutes the preferred forms and embodiments of the invention have been illustrated and described, it will be apparent to those skilled in the art that changes may be made without deviating from the invention described above.

What is claimed is:

1. A marking device for identifying a generally cylindrical conductor, comprising:

(a) a sectional hollow generally tubular shell (1) containing a horizontal longitudinal through passage (P) for receiving one of a plurality of conductors (13*a*-13*d*) of different diametric sizes, said shell being horizontally longitudinally divided to define upper (2) and lower (3) shell sections each having a generally U-shaped cross-sectional configuration, said upper shell section including a pair of leg portions (2*a*, 2*b*) joined by a bridging portion (2*c*), said upper shell section having an internal surface provided with means defining a conductor seat (S), said conductor seat defining means consisting of a pair of internal flat linear non-circular non-arcuate rigid integral wall portions (10, 11) arranged at an obtuse angle on the inner surfaces of said upper shell section leg portions relative to said bridging portion;

(b) an indicia-bearing plate (5) connected with the external surface of said upper shell section opposite said conductor seat;

(c) hinge means (4) pivotally connecting said lower section for movement from a closed position relative to said upper section toward an open position, thereby to permit the insertion of the insulated conductor within said upper section adjacent said conductor seat;

(d) locking means (7, 8, 9) for locking together said shell sections when said lower shell is in said closed position; and (e) biasing means (6) carried by said lower shell section for biasing the conductor laterally upwardly toward said conductor seat when said lower shell is in said closed position, said biasing means comprising a resilient integral continuous conductor support strap portion (6; 6') formed by punching from said lower shell section, thereby to define an opening (14; 14') therein across which said conductor support strap portion extends, said conductor support strap portion being deformed to extend inwardly from said lower shell section opening toward said conductor seat, said conductor support strap portion having a generally trapezoidal cross-sectional configuration including a horizontal center support portion (6*c*) opposite said conductor seat, and a pair of generally vertical resilient leg portions (6*a*, 6*b*) supporting said center portion in said vertical longitudinal plane relative to said lower shell section;

(f) said conductor seat flat wall portions, said indicia-bearing plate, and said strap center portion being symmetrically arranged relative to a vertical plane (V) passing longitudinally through said shell.

2. A marking device as defined in claim 1, wherein said shell sections have pairs of longitudinal edge portions that are adjacent when said lower shell is in said closed position; and further wherein said hinge means is connected between a first pair of said shell section longitudinal edge portions.

3. A marking device as defined in claim 2, wherein said shell sections are formed from a synthetic plastic material; and further wherein said hinge means is resilient and integral with said upper and lower shell sections.

4. A marking device as defined in claim 3, wherein said locking means is connected between a second pair of said shell section longitudinal edge portions.

5. A marking device as defined in claim 4, wherein said locking means includes a locking tongue (7) having a first end integrally connected with one of said shell sections, said locking tongue having at its other end a locking catch portion (9), said locking tongue being arranged to extend though a locking opening (8) contained in the adjacent longitudinal edge portion of the other shell section when said lower shell section is in said closed position, whereby said locking catch portion is in locking engagement with said other shell section.

6. A marking device as defined in claim 1, wherein said conductor support strap portion (6') has a convex generally semi-circular cross-sectional configuration, said conductor strap portion being resilient and containing at least one centrally arranged constriction (12'), thereby to cause the central part of said conductor strap support portion to collapse toward the internal surface of said lower shell section in accordance with the diametric size of the conductor.

7. A marking device for identifying a generally cylindrical conductor, comprising:

(a) a sectional hollow generally tubular shell (1) containing a horizontal longitudinal through passage (P) for receiving one of a plurality of conductors (13*a*-13*d*) of different diametric sizes, said shell being horizontally longitudinally divided to define upper (2) and lower (3) shell sections each having a generally U-shaped cross-sectional configuration, said upper shell section including a pair of leg portions (2*a*, 2*b*) joined by a bridging portion (2*c*), said upper shell section having an internal surface provided with means defining a conductor seat (S), said conductor seat defining means consisting of a pair of internal flat linear non-circular non-arcuate rigid integral wall portions (10, 11) arranged at an obtuse angle on the inner surfaces of said upper shell section leg portions;

(b) an indicia-bearing plate (5) connected with the external surface of said upper shell section opposite said conductor seat;

(c) hinge means (4) pivotally connecting said lower section for movement from a closed position relative to said upper section toward an open position, thereby to permit the insertion of the insulated conductor within said upper section adjacent said conductor seat;

(d) locking means (7, 8, 9) for locking together said shell sections when said lower shell is in said closed position; and (e) biasing means (6) carried by said lower shell section for biasing the conductor laterally upwardly toward said conductor seat when said lower shell is in said closed position, said biasing means comprising a resilient integral continuous conductor support strap portion (6; 6') formed by punching from said lower shell section, thereby to define an opening (14; 14') therein across which said conductor support strap portion extends, said conductor support strap portion being deformed to extend inwardly from said lower shell section opening toward said conductor seat, said conductor support strap portion having a generally trapezoidal cross-sectional configuration including a horizontal center support portion (6*c*) opposite said conductor seat, and a pair of generally vertical resilient leg portions (6*a*, 6*b*) supporting said center portion in said vertical longitudinal plane relative to said lower shell section, each of said resilient leg portions containing intermediate its ends a first constriction (12) defining a pair of collapsible articulated sections, the ends of each of said leg portions being connected by second constrictions with said lower shell section and with said strap center support section, respectively;

(f) said conductor seat flat wall portions, said indicia-bearing plate, and said strap center portion being symmetrically arranged relative to a vertical plane (V) passing longitudinally through said shell.

8. A marking device as defined in claim 7, wherein said resilient leg portions are such that when a conductor having a relatively large diametric size is supported in the shell through passage, portions of said articulated leg sections extend partially outwardly of the shell through said wall opening.

9. A marking device for a generally cylindrical conductor, comprising:

(a) a horizontal generally tubular shell (1) containing a through passage for receiving one of a plurality of conductors having different diametric sizes, said shell being horizontally divided to define upper (2) and lower (3) shell sections, (1) said upper shell section (2) having an inverted generally U-shaped cross-sectional configuration defining a pair of first leg portions (2*a*, 2*b*) joined by a first bridging portion (2*c*), said first leg portions having two flat linear non-circular non-arcuate internal surfaces (10, 11) adjacent said bridging portion that are angularly inclined at an obtuse angle, thereby to define a conductor seat (S) that is centrally arranged relative to the vertical plane (V) passing longitudinally through the shell;

(2) said lower shell section (3) having a generally U-shaped cross-sectional configuration defining a pair of second leg portions (3*a*, 3*b*) joined by a second bridging portion (3*c*), said shell sections having pairs of adjacent longitudinal edge portions;

(b) an indicia-bearing plate (5) supported by the external surface of said first shell section directly above said conductor seat;

(c) hinge means (4) connecting a first pair of said longitudinal edge portions, thereby to permit pivotal movement of said lower shell section from a closed position toward an open position relative to said upper shell section, thereby to permit the lateral insertion of the conductor within said upper shell section adjacent said conductor seat;

(d) locking means (7, 8, 9) for locking together the other pair of longitudinal edge portions when said second section is in said closed position, and the conductor is enclosed within said shell; and (e) biasing means (6; 6') carried by said second shell section for biasing the conductor laterally toward said conductor seat, said biasing means comprising an integral continuous transversely-extending resilient support strap punched from said lower section, and support strap being deformed inwardly toward said conductor seat and containing a constriction (12') opposite said support seat;

(f) said conductor seat flat surfaces, said indicia-bearing plate, and said biasing means being symmetrically arranged relative to said vertical plane passing longitudinally through said shell.

* * * * *